(12) United States Patent
Inoue et al.

(10) Patent No.: US 10,102,267 B2
(45) Date of Patent: Oct. 16, 2018

(54) METHOD AND APPARATUS FOR ACCESS CONTROL

(71) Applicant: FUJITSU LIMITED, Kawasaki-shi, Kanagawa (JP)

(72) Inventors: Kazuhiko Inoue, Akashi (JP); Toshiaki Senda, Akashi (JP); Nozomi Minami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 343 days.

(21) Appl. No.: 14/612,378

(22) Filed: Feb. 3, 2015

(65) Prior Publication Data
US 2015/0235038 A1    Aug. 20, 2015

(30) Foreign Application Priority Data
Feb. 14, 2014  (JP) .................................. 2014-026056

(51) Int. Cl.
*G06F 17/30* (2006.01)

(52) U.S. Cl.
CPC .............................. *G06F 17/30584* (2013.01)

(58) Field of Classification Search
CPC ............ G06F 17/30584; G06F 9/5083; G06F 9/5077; G06F 11/1662; G06F 11/182; G06F 17/30486; G06F 17/30339
USPC ........................................................ 707/737
See application file for complete search history.

(56) References Cited

U.S. PATENT DOCUMENTS

| | | | | |
|---|---|---|---|---|
| 5,765,204 | A | * | 6/1998 | Bakke ..................... G06F 3/061 711/112 |
| 6,070,191 | A | * | 5/2000 | Narendran ............... G06F 9/505 709/217 |
| 8,903,878 | B2 | * | 12/2014 | Kihara .................. G06F 3/0611 707/758 |
| 2006/0184565 | A1 | | 8/2006 | Nishikawa et al. |
| 2012/0173831 | A1 | * | 7/2012 | Rubio ................... G06F 3/0605 711/165 |
| 2017/0097787 | A1 | * | 4/2017 | Hendry ................. G06F 3/0619 |

FOREIGN PATENT DOCUMENTS

| | | | | |
|---|---|---|---|---|
| JP | 06-139119 | * | 5/1994 | ............. G06F 12/00 |
| JP | 6-139119 | | 5/1994 | |
| JP | 9-218858 A | | 8/1997 | |
| JP | 2001-142752 | | 5/2001 | |
| JP | 2006-221513 A | | 8/2006 | |

OTHER PUBLICATIONS

Japanese Office Action dated Jul. 4, 2017 for corresponding Japanese Patent Application No. 2014-026056, with English Translation, 8 pages.

* cited by examiner

*Primary Examiner* — Evan Aspinwall
(74) *Attorney, Agent, or Firm* — Fujitsu Patent Center

(57) ABSTRACT

An access control apparatus includes an acquisition unit and a changing unit. The acquisition unit divides the data stored in a storage device, which is to be accessed from a plurality of access devices, into a plurality of data groups, and obtains the access frequencies of the individual data groups, which are based on accesses to the data belonging to the data groups. The changing unit changes, on the basis of the access frequencies of the individual data groups, definition of data groups accessible by the individual access devices such as to reduce a difference in total access frequency of accessible data groups among the plurality of access devices.

5 Claims, 18 Drawing Sheets

111 STATISTICAL INFORMATION STORAGE UNIT

111a STATISTICAL INFORMATION MANAGEMENT TABLE

| CONNECTION | CONNECT TIME | DATA GROUP | RECORD REFERENCE COUNT | RECORD UPDATE COUNT |
|---|---|---|---|---|
| CONNECTION #3 | 2013/1/22-10:00:01 | DATA GROUP #25 | 80021 | 32 |
| CONNECTION #5 | 2013/1/22-10:01:05 | DATA GROUP #101 | 6632077 | 56012 |
| ⋮ | ⋮ | ⋮ | ⋮ | ⋮ |

METADATA

341 PARTITION MANAGEMENT TABLE

| PARTITION NAME | NODE NAME | CONSTITUENT DATA GROUP COUNT | CONSTITUENT DATA GROUP NAME | ... |
|---|---|---|---|---|
| P001 | RDBSYS01 | 2 | DATA GROUP 87 | ... |
| P002 | RDBSYS02 | 7 | DATA GROUP 101 | ... |
| ⋮ | ⋮ | ⋮ | ⋮ | ⋮ |

342 GROUPING KEY COLUMN INFORMATION

| COLUMN COUNT | COLUMN NAME | ... |
|---|---|---|
| 1 | PRODUCT GROUP CODE | ... |

343 DATA GROUP INFORMATION TABLE

| DATA GROUP NAME | DATA VALUE | STORAGE AREA INFORMATION | | |
|---|---|---|---|---|
| | | SPACE NAME | SIZE | BEGINNING BLOCK NUMBER |
| DATA GROUP 1 | 101 | DB SPACE 001 | 100 | 1 |
| DATA GROUP 2 | 102 | DB SPACE 001 | 100 | 101 |
| ⋮ | ⋮ | ⋮ | ⋮ | ⋮ |

FIG. 11

80 DATA GROUP LIST

| No. | DATA GROUP | ACCESS AMOUNT |
|---|---|---|
| 1 | Group1021 | 33200 |
| 2 | Group0540 | 33200 |
| 3 | Group0088 | 28501 |
| ⋮ | ⋮ | ⋮ |
| 1208 | Group0310 | 188 |
| 1209 | Group0123 | 155 |
| 1210 | Group1208 | 11 |

→ PARTITION 1
→ PARTITION 2

FIG. 13

81 CURRENT PARTITION INFORMATION

| COMBINATION DETERMINATION FLAG | PARTITION NAME | CONSTITUENT DATA GROUP COUNT | CONSTITUENT DATA GROUP NAME 1 | CONSTITUENT DATA GROUP NAME 2 | ... |
|---|---|---|---|---|---|
| 0 | P001 | 88 | DG00087 | DG00120 | ... |
| 0 | P002 | 256 | DG00005 | DG05201 | ... |
| ⋮ | ⋮ | ⋮ | ⋮ | ⋮ | ... |

FIG. 16

82 DATA GROUP LIST
(SORTED IN DESCENDING ORDER)

| PROCESS COMPLETION FLAG | DATA GROUP NAME | ACCESS AMOUNT |
|---|---|---|
| 0 | DG00055 | 13828612 |
| 0 | DG01207 | 10255208 |
| ⋮ | ⋮ | ⋮ |

FIG. 17

METHOD AND APPARATUS FOR ACCESS CONTROL

CROSS-REFERENCE TO RELATED APPLICATION

This application is based upon and claims the benefit of priority of the prior Japanese Patent Application No. 2014-026056, filed on Feb. 14, 2014, the entire contents of which are incorporated herein by reference.

FIELD

The embodiments discussed herein relate to a method and apparatus for access control.

BACKGROUND

In distributed computing, there are two architectures for accessing resources from a plurality of nodes: shared-everything and shared-nothing. Each of these architectures has its advantages and disadvantages. In the shared-everything architecture, resources are shared among all nodes in a system and so are accessible by the nodes. To achieve the resource sharing, exclusive control is exercised to prevent conflicts in accessing resources, such as databases, which reduces processing efficiency. An increase in the load of the exclusive control becomes more prominent with an increase in the scale of a system and also in the number of nodes.

In the shared-nothing architecture, on the other hand, nodes do not share any resources and all nodes have sole access. Since database resources are not shared among the nodes, no conflicts occur among the nodes. Therefore, linear performance improvement is expected by adding nodes.

In the shared-nothing architecture, a database is divided into a plurality of partitions, for example. In addition, a plurality of data records included in data tables forming the database are grouped according to type, and each group is allocated to any of the partitions. The data of each group is stored in the corresponding partition. Each partition is accessible by any one of nodes. This prevents conflicts in data access.

While a system keeps operating, an amount of managed data may increase and the system may lack resources. For example, scale-out is one way to add new nodes. The scale-out involves dividing data tables according to dividing of a database into partitions and reassigning the partitions to the nodes.

One of techniques for dividing data uses a hash function, for example. This technique uses one or a plurality of data elements in a database as partitioning keys, applying the hash function to the partitioning keys, and divides data into a plurality of buckets.

Please see, for example, Japanese Laid-open Patent Publication No. 2001-142752.

However, the shared-nothing architecture has a drawback in which it is difficult to determine which data to store in each of a plurality of partitions such that nodes have a small difference in access load. For example, the way of regularly allocating data to partitions using a hash function or the like does not take patterns of data access into account. Therefore, there is a possibility that accesses may be concentrated on a partition where data with high access frequency exists, and therefore an access load imbalance may occur among nodes. If this happens, nodes with higher loads become slow in processing, which reduces the operating efficiency of the system.

Such an access load imbalance among nodes would be reduced if a skilled engineer spent a considerable time on dividing a data table into partitions and assigning the partitions to the nodes through hearing about customers' business contents. However, it is difficult for even such a skilled engineer to always make an appropriate decision, and the actual data access status may be greatly different from expected one. If this happens, an access load imbalance may occur among the nodes.

Further, patterns of access to resources in business are likely to vary. Even if equal access load balancing is achieved when a system starts to operate, an access load imbalance may occur among the nodes while the system keeps operating.

SUMMARY

According to one aspect, there is provided a non-transitory computer-readable storage medium storing a computer program that causes a computer to perform a process including: obtaining an access frequency of each of a plurality of data groups, which is based on accesses to data belonging to the plurality of data groups, the plurality of data groups being generated by dividing data that is stored in a storage device and is accessed from a plurality of access devices; and changing, based on access frequencies of the plurality of data groups, definition of data groups accessible by individual ones of the plurality of access devices such as to reduce a difference in total access frequency of accessible data groups among the plurality of access devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 illustrates an example of a data structure of a statistical information storage unit;

FIG. 11 illustrates an example of information contained in metadata;

FIG. 13 illustrates an example of determining the configuration of partitions;

FIG. 16 illustrates an example of current partition information;

FIG. 17 illustrates an example of a data group list with a process completion flag field added.

DESCRIPTION OF EMBODIMENTS

Figure 1:
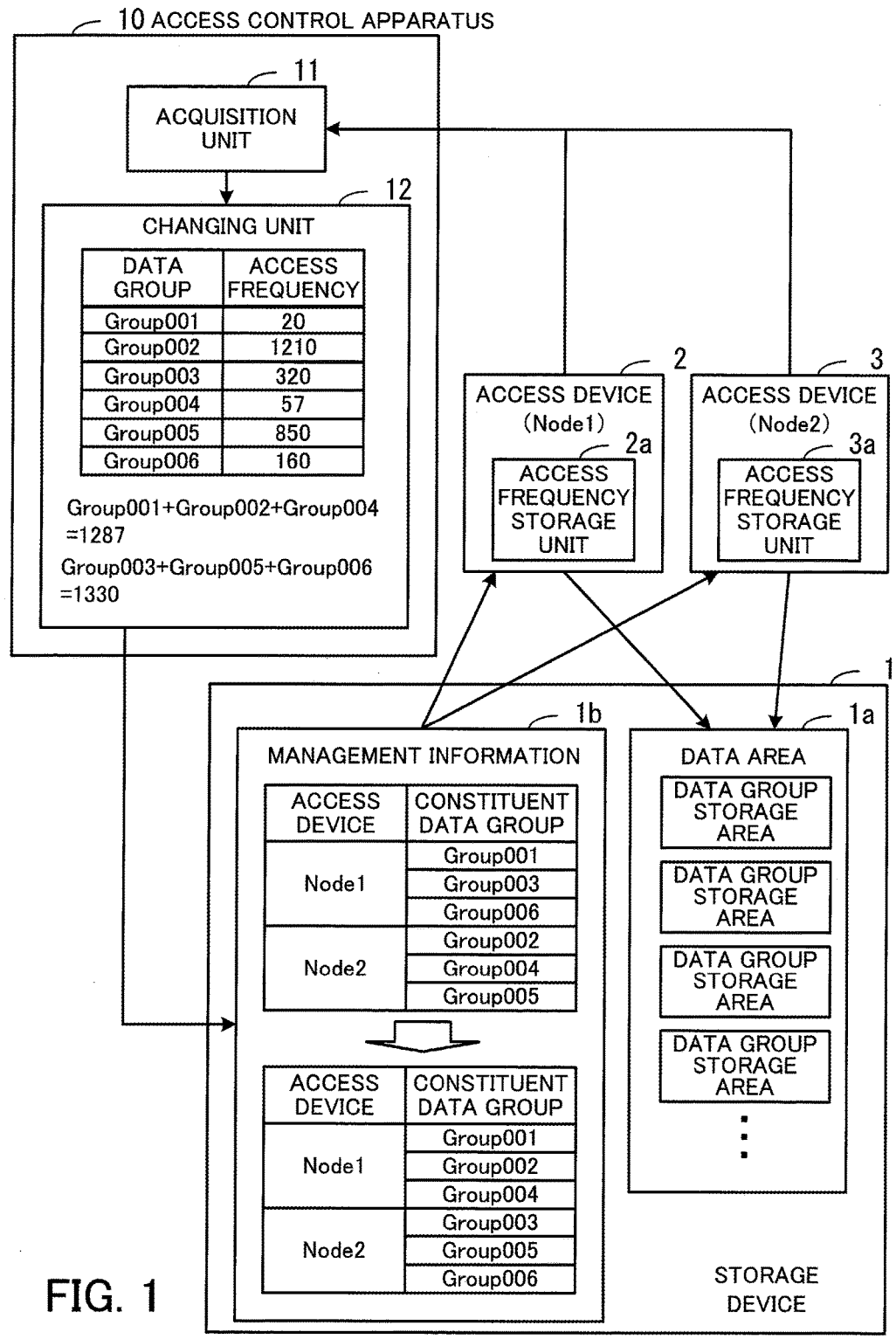
FIG. 1 illustrates an exemplary configuration of a system according to a first embodiment.

Several embodiments will be described below with reference to the accompanying drawings, wherein like reference numerals refer to like elements throughout. Features of the embodiments may be combined unless they exclude each other.

First Embodiment

FIG. 1 illustrates an exemplary configuration of a system according to a first embodiment. The illustrated system includes a storage device 1, a plurality of access devices 2 and 3, and an access control apparatus 10.

The storage device 1 transmits and receives data to and from the access devices 2 and 3. In the storage device 1, data to be accessed from the plurality of access devices 2 and 3 is divided into a plurality of data groups, for example. The data of each data group is stored in a storage area corresponding to the data group in a data area 1a. The storage device 1 also stores management information 1b. This management information 1b defines data groups that are accessible by the individual access devices 2 and 3. For example, the management information 1b identifies, in association with each access device, one or more data groups accessible by the access device, and also includes information indicating, in association with each data group, a storage area storing the data belonging to the data group.

The access devices 2 and 3 access data in the storage device 1 in accordance with access requests for the data received over a network or the like. For example, the access devices 2 and 3 access data with a shared-nothing algorithm. This algorithm allows each data block of the storage device 1, which is accessible at a time, to be accessible only by any one access device. For example, the access devices 2 and 3 recognize their accessible data groups with reference to the management information 1b, and then access data for read or write purposes in the accessible data groups.

In addition, the access devices 2 and 3 include access frequency storage units 2a and 3a, respectively. Each access frequency storage unit 2a and 3a stores information indicating an access frequency of each data group, which is based on accesses to the data stored in the storage device 1 from the access devices 2 and 3. The access frequency of a data group indicates, for example, how many times the data of the data group was accessed for a specified time period. Each time an access device 2 and 3 accesses data belonging to its accessible data group in the storage device 1, the access device 2 and 3 updates the access frequency of the data group. The access device 2 and 3 also notifies the access control apparatus 10 of the access frequency, for example, in response to a request from the access control apparatus 10.

The access control apparatus 10 determines which data groups are to be made accessible by each access device 2 and 3. To this end, the access control apparatus 10 includes an acquisition unit 11 and a changing unit 12.

The acquisition unit 11 obtains, from the access devices 2 and 3, information indicating the access frequency of each data group, which is based on access to the data of the data group. For example, when receiving a request for updating the management information, the acquisition unit 11 transmits the access devices 2 and 3 a request for the access frequencies, and then receives information indicating the access frequencies from the access devices 2 and 3. The acquisition unit 11 outputs the received information to the changing unit 12.

The changing unit 12 modifies the management information 1b on the basis of the access frequencies of the plurality of data groups such as to reduce a difference in the total access frequency of accessible data groups between the plurality of access devices 2 and 3.

For example, the changing unit 12 calculates the average access frequency based on data accesses made from the plurality of access devices 2 and 3, and may not change data groups that are accessible by access devices whose access frequencies fall within a specified range from the average access frequency. This reduces the number of indexes to be recreated according to a change in combinations of accessible data groups and thus streamlines the processing.

In addition, in modifying the management information 1b, the changing unit 12 may change the combinations of accessible data groups for the access devices while maintaining the information indicating the storage areas in association with the data groups. That is, the modification of the management information 1b does not involve migrating data within the data area 1a. As a result, it becomes easy to change data groups accessible by the access devices 2 and 3.

In such a system, each access device 2 and 3, when receiving an access request, determines with reference to the management information 1b whether data specified by the access request belongs to its accessible data group or not. Then, when the data belongs to the accessible data group, the access device 2 and 3 accesses the specified data in the storage device 1. In conjunction with accessing the data, the access device 2 and 3 updates the access frequency of the data group to which the data belongs.

After that, when the access control apparatus 10 receives a request for updating management information, the acquisition unit 11 obtains information indicating access frequencies from the access devices 2 and 3, and outputs the obtained information to the changing unit 12.

When receiving the information indicating the access frequencies, the changing unit 12 modifies the management information 1b such as to reduce a difference in the total access frequency of accessible data groups between the plurality of access devices 2 and 3. Referring to the example of FIG. 1, there are two access devices 2 and 3 and therefore, the changing unit 12 generates two combinations of data groups. At this time, each data group is placed into either combination. In addition, the changing unit 12 generates the two combinations such that a difference in the total access frequency of data groups between the two combinations is small. The changing unit 12 then determines which of the two combinations is to be made accessible by each of the two access devices 2 and 3. Then, the changing unit 12 updates the management information 1b according to the determination.

The above approach makes it possible to reduce an access load imbalance among access devices. For example, FIG. 1 depicts that, before the management information 1b is updated, three data groups whose data group names are Group001, Group003, and Group006 are accessible by the access device 2, while three data groups whose data group names are Group002, Group004, and Group005 are accessible by the access device 3. In this example, two data groups Group002 and Group005 having the highest and the second highest access frequencies, respectively, are both accessible by the access device 3. This means that the access device 3 has higher access load than the access device 2.

Referring to the example of FIG. 1, after the management information 1b is updated, three data groups Group001, Group002, and Group004 are accessible by the access device 2, while three data groups G003, Group005, and Group006 are accessible by the access device 3. After the update, the total access frequency of the accessible data groups by the access device 2 is "1287", and the total access frequency of the accessible data groups by the access device 3 is "1330". In this way, the access control apparatus 10 is able to update the management information 1b so as to reduce a difference in the total access frequency of accessible data groups between the access devices 2 and 3, which thereby reduces an access load imbalance between the access devices 2 and 3. This results in improving the entire data access efficiency of the system.

Note that the access control apparatus 10 and access devices 2 and 3 are implemented by using computers. In this case, the acquisition unit 11 and changing unit 12 are implemented by using, for example, a processor of the access control apparatus 10. In addition, the access frequency storage units 2a and 3a may be implemented by using, for example, the memories of the access devices 2 and 3.

Further, lines connecting between units illustrated in FIG. 1 represent part of communication paths, and communication paths other than the illustrated ones may be configured.

Second Embodiment

The following describes the second embodiment. The second embodiment is intended to equally balance access load among a plurality of database servers in the situation where data stored in a plurality of storage devices is accessed via the database servers. In the second embodiment, equally balancing load means minimizing a load imbalance. A small load imbalance finally caused is tolerated.

In the second embodiment, a relational database (RDB) is divided into a plurality of partitions so that data is accessible from a plurality of database servers with the shared-nothing algorithm. Partitions are each formed of a plurality of logical data groups (for example, groups based on product codes). Then, the partitions are reconfigured by moving at least some of the data groups from their partitions to others on the basis of the access frequencies of the individual data groups so that the partitions have equally-balanced access frequencies. The reconfiguration of partitions is a process of changing the combinations of data groups forming the partitions, in order to equally balance load among the plurality of database servers.

Partitions are reconfigured by, for example, combining groups with high access frequencies and groups with low access frequencies. As a result, the partitions having average access frequencies are configured. In addition, the partitions may be reconfigured by modifying metadata without the need of migrating table data.

Figure 2:
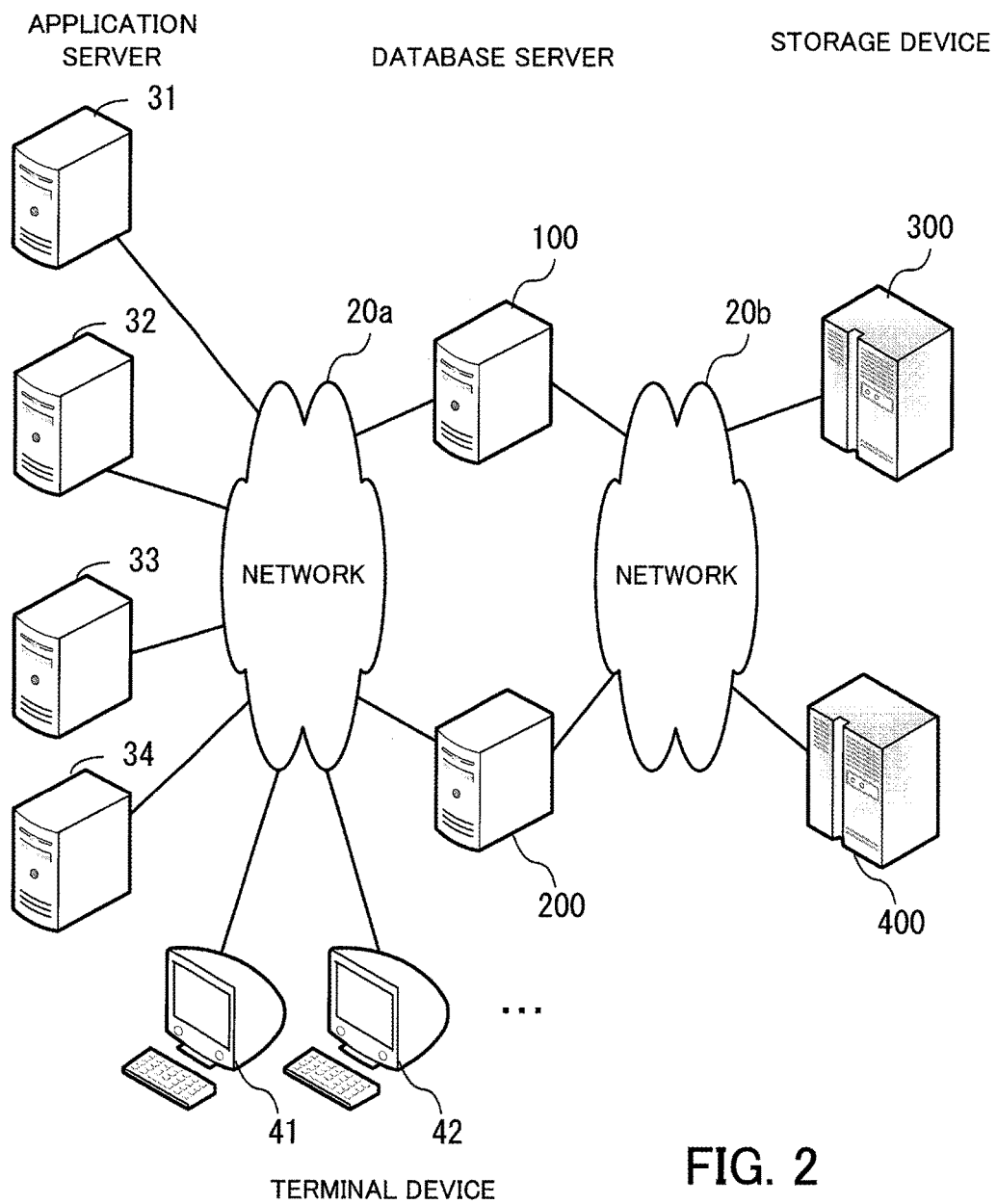
FIG. 2 illustrates an exemplary configuration of a system according to a second embodiment.

FIG. 2 illustrates an exemplary configuration of a system according to the second embodiment. A plurality of application servers 31 to 34 are connected to a plurality of database servers 100 and 200 over a network 20a. The application servers 31 to 34 are computers that execute application programs in response to processing requests from terminal devices 41, 42, . . . . The database servers 100 and 200 are computers that manage databases.

The terminal devices 41, 42, . . . are connected to the network 20a. The terminal devices 41, 42, . . . are computers that perform processes in accordance with user operations. The plurality of database servers 100 and 200 is connected to storage devices 300 and 400 over a network 20b. Each storage device 300 and 400 is provided with one or more built-in Hard Disk Drives (HDD) or Solid State Drives (SSD).

Data that forms a database is stored in the storage devices 300 and 400 in a distributed manner. The database is divided into a plurality of partitions. In addition, the data in the database is divided into a plurality of data groups, each of which corresponds to any of the partitions. Each partition is assigned to any one of the database servers. The data of the data groups included in a partition is accessible only by a database server assigned the partition.

The terminal devices 41, 42, . . . transmit processing requests to the application servers 31 to 34 in accordance with user inputs. The application servers 31 to 34 process the received processing requests. When requested for a process involving read or update access to data in the database, an application server 31 to 34 transmits a data access request to any one of the database servers. If the database server, having received the data access request, confirms that the requested data is its accessible data, the database server accesses the data in the storage device. If the requested data is not its accessible data, on the other hand, the database server requests another database server to access the data.

In such a system, the partitions are reconfigured so as to equally balance processing load among the plurality of database servers 100 and 200.

Figure 3:
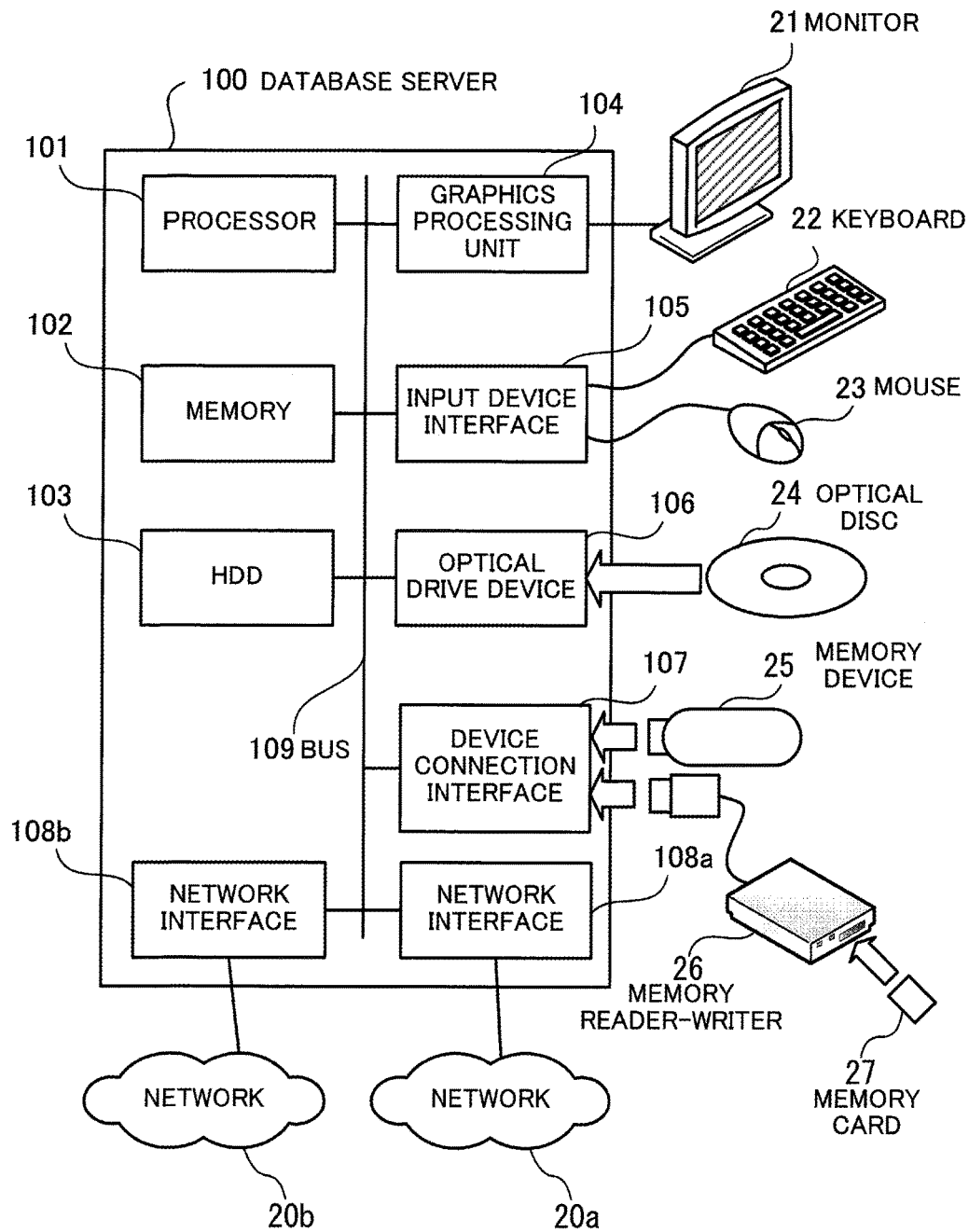
FIG. 3 illustrates an example of a hardware configuration of a database server that is used in the second embodiment.

FIG. 3 illustrates an example of a hardware configuration of a database server that is used in the second embodiment. The database server 100 is entirely controlled by a processor 101. A memory 102 and a plurality of peripherals are connected to the processor 101 via a bus 109. The processor 101 may be a multiprocessor. The processor 101 may be, for example, a Central Processing Unit (CPU), a Micro Processing Unit (MPU), or a Digital Signal Processor (DSP). Some or all of the functions that are performed by the processor 101 running programs may be implemented by using an Application Specific Integrated Circuit (ASIC), Programmable Logic Device (PLD), or other electronic circuits.

The memory 102 is used as a primary storage device of the database server 100. The memory 102 temporarily stores at least part of Operating System (OS) programs and application programs to be executed by the processor 101. The memory 102 also stores various data to be used while the processor 101 operates. As the memory 102, for example, a Random Access Memory (RAM) or another volatile semiconductor storage device may be used.

The peripherals connected to the bus 109 include an HDD 103, a graphics processing device 104, an input device interface 105, an optical drive device 106, a device connection interface 107, and network interfaces 108a and 108b.

The HDD 103 magnetically writes and reads data on a built-in disk. The HDD 103 is used as a secondary storage device of the database server 100. The HDD 103 stores the OS programs, application programs, and various data. As a secondary storage device, a non-volatile semiconductor storage device, such as an SSD flash memory and another, may be used.

A monitor 21 is connected to the graphics processing device 104. The graphics processing device 104 displays images on the screen of the monitor 21 in accordance with instructions from the processor 101. As the monitor 21, a display device using Cathode Ray Tube (CRT), a liquid crystal display device, or the like may be used.

A keyboard 22 and a mouse 23 are connected to the input device interface 105. The input device interface 105 gives the processor 101 signals received from the keyboard 22 and mouse 23. The mouse 23 is one example of pointing devices, and another pointing device may be used. Other pointing devices include, for example, a touch panel, a tablet, a touchpad, a track ball, and so on.

The optical drive device 106 reads data from an optical disc 24 with laser light or the like. The optical disc 24 is a portable recording medium on which data is recorded so as to be read with reflection of light. As the optical disc 24, a Digital Versatile Disc (DVD), DVD-RAM, Compact Disc Read Only Memory (CD-ROM), CD-R (Readable), CD-RW (ReWritable), or the like may be used.

The device connection interface 107 is a communication interface that allows peripherals to be connected to the database server 100. For example, a memory device 25 and a memory reader-writer 26 may be connected to the device connection interface 107. The memory device 25 is a recording medium provided with a function for communication with the device connection interface 107. The memory reader-writer 26 is a device that performs data read and write on the memory card 27. The memory card 27 is a card-type recording medium.

The network interfaces 108a and 108b are connected to the networks 20a and 20b, respectively. The network interface 108a communicates data with the application servers 31 to 34 over the network 20a, while the network interface 108b communicates data with the storage devices 300 and 400 over the network 20b.

With the above hardware configuration, the processing functions of the second embodiment may be implemented. In this connection, the access control apparatus 10 and access devices 2 and 3 of the first embodiment may be configured with the same hardware as the database server 100 of FIG. 3.

The database server 100 performs the processing functions of the second embodiment by, for example, executing a program recorded on a computer-readable recording medium. The program describing the contents of processing to be performed by the database server 100 may be recorded on a variety of recording media. For example, the program to be executed by the database server 100 may be stored on the HDD 103. The processor 101 loads at least part of the program from the HDD 103 to the memory 102 and runs the program. Alternatively, the program to be executed by the database server 100 may be stored on a portable recording medium, such as an optical disc 24, a memory device 25, a memory card 27, and the like. The program stored in the portable recording medium is installed in the HDD 103, for example, under the control of the processor 101, and thereby becomes executable. The processor 101 may run the program directly from the portable recording medium.

The following describes database partitioning.

Figure 4:
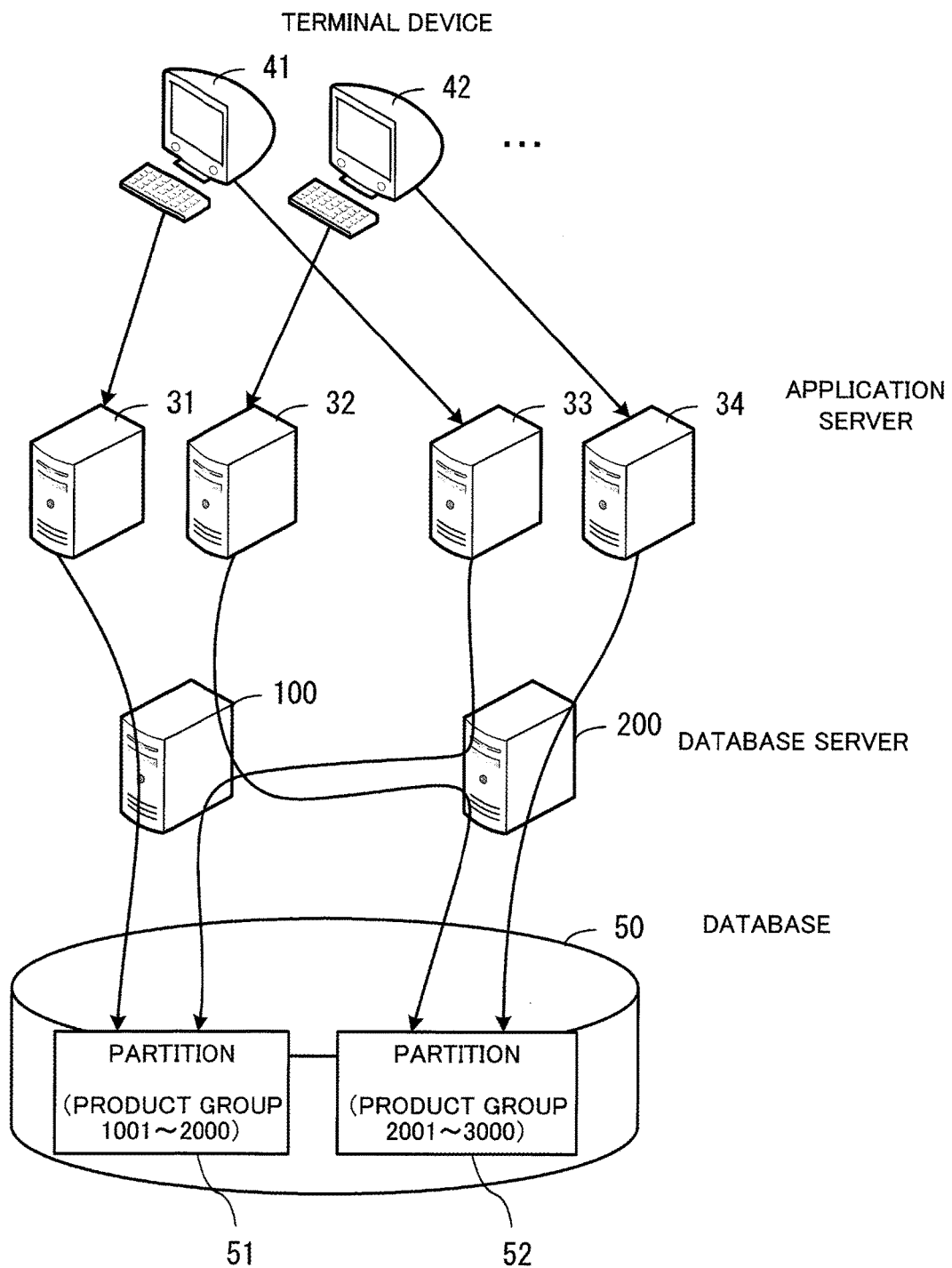
FIG. 4 illustrates an example of partitioning.

FIG. 4 illustrates an example of partitioning. Each terminal device 41, 42, . . . sends a processing request to any of the application servers 31 to 34 in accordance with user operation. When the application server 31 to 34 needs to use data contained in a database 50 during the course of performing the requested process, the application server 31 to 34 sends an access request for the data to any of the database servers 100 and 200.

The data contained in the database 50 is divided into a plurality of partitions 51 and 52. The database servers 100 and 200 are assigned their accessible partitions. Referring to the example of FIG. 4, the partition 51 is accessible by the database server 100, while the partition 52 is accessible by the database server 200.

When a database server 100 and 200 receives an access request for data of its accessible partition, the database server 100 and 200 accesses the data and then returns the access result to the transmission source of the access request. For example, when the database server 100 receives an access request for data in the partition from the application server 31, the database server 100 accesses the data and returns the access result to the application server 31.

On the other hand, when a database server 100 and 200 receives an access request for data in a partition that is accessible by another database server, the database server 100 and 200 transfers the access request to the database server that is able to access the partition to which the data belongs. The database server that receives the transferred access request accesses the requested data. For example, when the database server 100 receives an access request for data in the partition 52 from the application server 32, the database server 100 transfers the access request to the database server 200. The database server 200 then accesses the data in the partition 52 in accordance with the transferred access request, and returns the access result to the database server 100. The database server 100 transfers the received access result to the application server 32.

In such a partitioning technique, it is difficult to manually design the table partitioning so as to equally balance access load between the database servers 100 and 200. For example, assume now that product groups with product group numbers "1001 to 2000" belong to the partition 51 and product groups with product group numbers "2001 to 3000" belong to the partition 52. If the product groups with the product group numbers "1001 to 1010" account for 90% of all orders, this means that load balancing between the two database servers 100 and 200 is not effective. That is to say, such a simple design of equally dividing the number of product groups does not lead to equally balancing access load between the database servers 100 and 200. By contrast, the second embodiment obtains the access frequencies of individual data groups from the database servers 100 and 200 and performs partitioning based on the access frequencies to determine which data groups are to belong to each partition.

Figure 5:
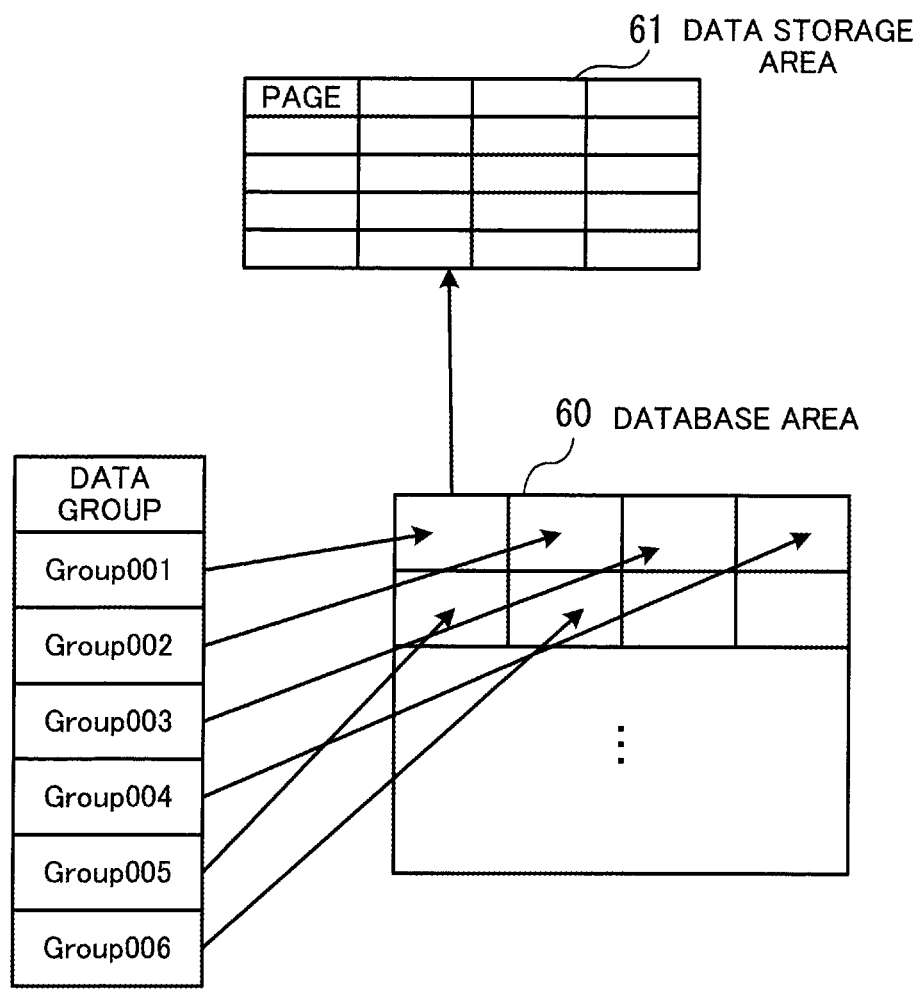
FIG. 5 illustrates relationship between data groups of a database and a storage area of a storage device.

FIG. 5 illustrates relationship between data groups of a database and a storage area of a storage device. The data contained in the data tables forming a database is divided into a plurality of data groups. A database area 60 of each storage device 300 and 400 includes a plurality of data storage areas 61, each for one data group. The data storage areas 61 for the individual data groups are part of the storage area of the storage device 300 and 400. The data of each data group is stored in a data storage area corresponding to the data group. Each data storage area 61 for storing the data of a single data group is formed of a plurality of consecutive pages. This allows the data of the single data group to be collectively stored in consecutive storage areas. Since the data of the same data group is accessed from the same database server, the access efficiency is improved.

When there is less free space left in the data storage area for a data group, the data storage area is expanded. For example, the database servers 100 and 200 hold statistical information indicating an area usage amount per unit time, and determine the amount of one-time expansion on the basis of the statistical information. In this case, a larger amount of expansion is determined for the data storage area corresponding to a data group with a larger usage amount. Determining the amount of one-time area expansion on the basis of the statistical information about the area usage amount in this way makes it possible to prevent too much expansion and to increase the use efficiency of the storage space of the database area 60.

On the other hand, for example, if the data storage area for a data group is little used, part of the free space of the data storage area may be released. More specifically, at least some pages of the data storage area allocated to the data group are released. Releasing part of a data storage area (for example, initially allocated area) with a little area usage amount increases the use efficiency of the storage space of the database area 60.

In addition, the second embodiment creates partitions on the basis of obtained statistical information.

Figure 6:
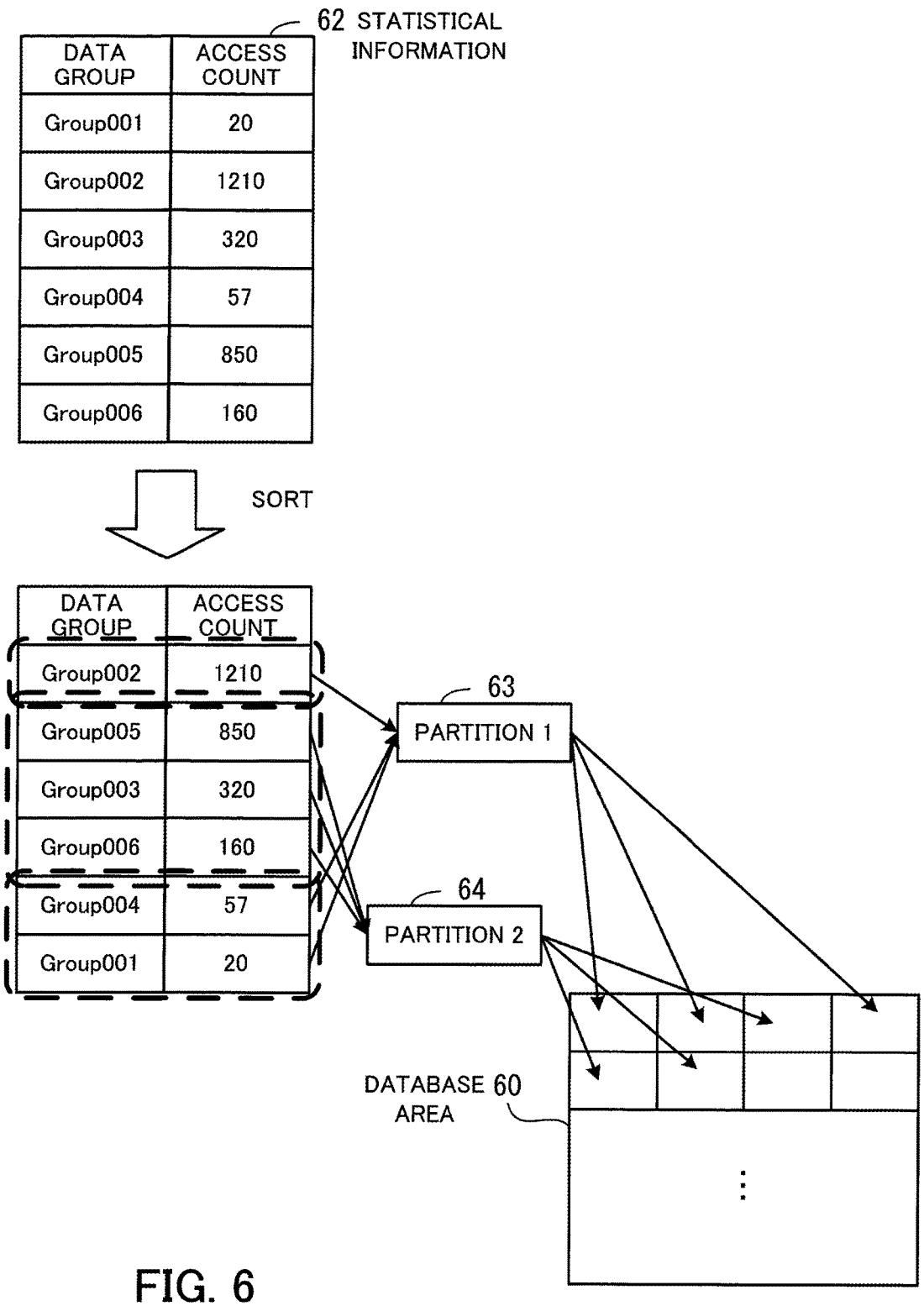
FIG. 6 illustrates an exemplary process of creating partitions.

FIG. 6 illustrates an exemplary process of creating partitions. The database servers 100 and 200 obtain and hold an access count for each data group as statistical information 62. Then, any of the database servers 100 and 200 performs a partition creation process. The partition creation process is to determine combinations of data groups (data group sets) so that the combinations will have equally-balanced access amounts. For example, the data groups are sorted in descending order of access count. Then, for example, a data group with higher access count and a data group with lower access count are combined as a data group set. In addition, a plurality of data groups with almost average access counts is combined as a data group set. Then, the data group sets are allocated to the partitions 63 and 64.

Data storage areas storing the data of the data groups in the data group set corresponding to each of the partitions 63 and 64 are taken as data storage areas storing the data of the partition. Each of the created partitions 63 and 64 is accessible by a single database server, as illustrated in FIG. 4.

Such appropriate allocation of data groups to a plurality of partitions as described above makes it possible to achieve equal load balancing between the database servers 100 and 200.

It is noted that, if all of the data contained in the database 50 are saved to another storage device when partitions are recreated while the system is operating, it takes too much time to reallocate data. For example, consider the case where the access load of the database server 100 that is able to access the partition increases due to a rapid increase in the number of orders for the product groups "1500 to 1510". To perform the equal load balancing between the database servers 100 and 200, there is an idea of performing a process of unloading data, changing the definition of partitions, and loading the data according to the definition of new partitions. The processing time for this process varies according to the scale of the database. For example, in the case of 10 terabyte data, it takes about 56 hours to perform the reconfiguration using the I/O performance of 100 M/s.

By contrast, in the second embodiment, the recreation of partitions involves changing a correspondence between partitions and data groups, but does not involve saving or re-storing data. This achieves switching to data access to new partitions in a short time after recreation of partitions. A correspondence between partitions and data groups and a correspondence between data groups and data storage areas are defined in, for example, metadata.

Figure 7:
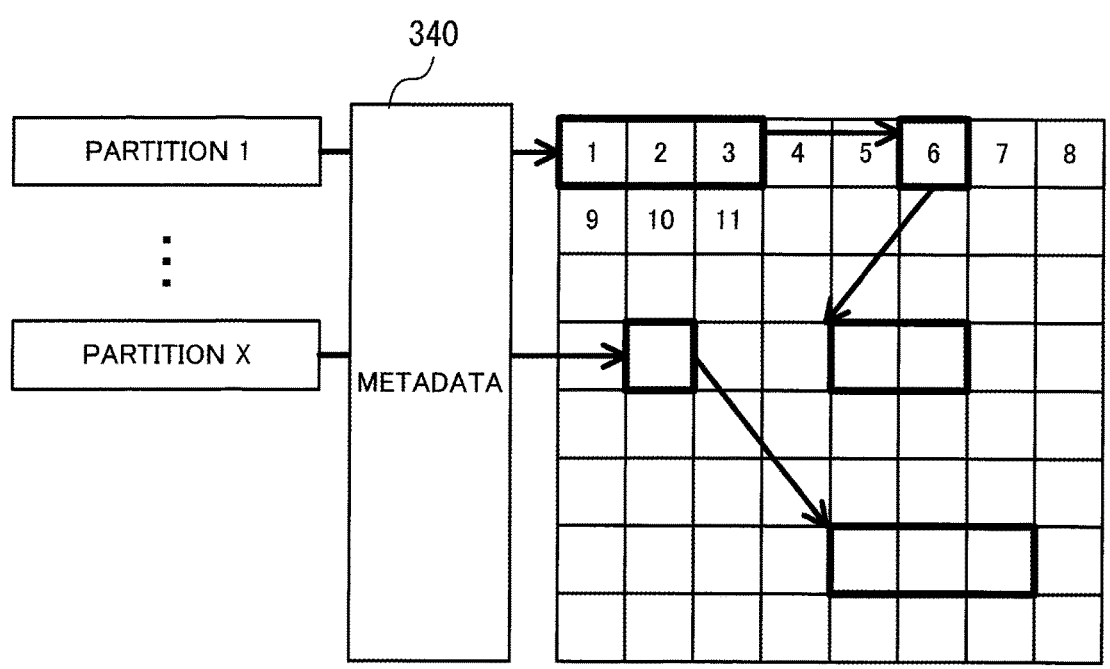
FIG. 7 illustrates an example of a correspondence between partitions and data storage areas.

FIG. 7 illustrates an example of a correspondence between partitions and data storage areas. Metadata 340 defines which data groups belong to each partition. The metadata 340 also defines which storage areas of the storage devices 300 and 400 store the records belonging to each data group. That is, the metadata 340 may be referenced for determining a data group to which a record including data to be accessed belongs and a partition to which the data group belongs.

Therefore, updating the metadata 340 leads to changing data groups that belong to partitions to be accessed by the database servers 100 and 200. In the second embodiment, when the loads of the database servers 100 and 200 become out of balance, the correspondence between partitions and data groups is changed in the metadata. This eliminates the need of migrating data and makes it possible to change the setting of the partitions in a short time, irrespective of the scale of the database.

Note that the second embodiment is not intended to resolve an imbalance in I/O frequency among a plurality of storage devices, and thus does not involve migrating data according to reconfiguration of partitions. Although the imbalance in I/O frequency among the plurality of storage devices may remain, such an imbalance have little influence on the entire system because recent advanced storage devices offer very fast I/O speed. For example, using SSDs (memories) to store database data remarkably improves the I/O speeds of storage devices. Alternatively, storage devices that automatically reallocate data according to the I/O loads of disks are available. As described above, with the I/O acceleration technology developed for storage devices, there are many cases where data allocation is performed without taking into account the I/O load balancing.

Therefore, minimizing a load imbalance among database servers leads to an improvement in the entire processing efficiency of a system. The second embodiment reduces time to switch to partitions that provide an equal load balance among database servers by giving up resolving an I/O imbalance among storage devices in the reconfiguration of partitions. This makes it easy to change the data access environment to a more efficient one.

Note that the change in the configuration of partitions involves recreating the indexes of the individual partitions. The indexes have a data structure, like a B-tree, for example. The B-tree is one kind of structure model representing a data structure, in which a plurality of nodes is connected in a tree structure.

Figure 8:
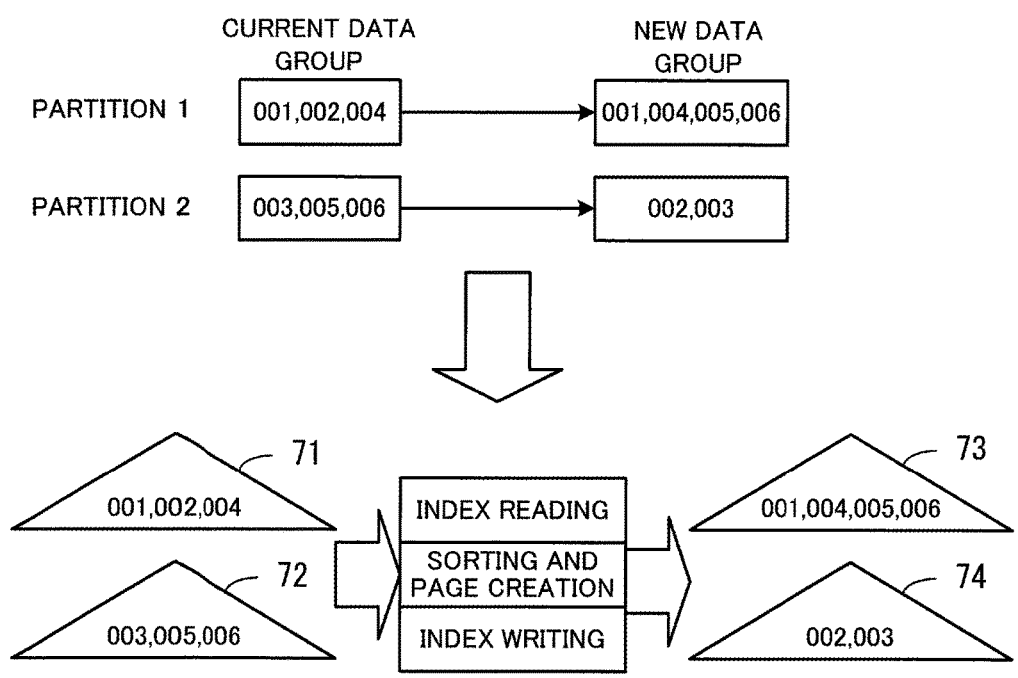
FIG. 8 illustrates an example of recreation of indexes.

FIG. 8 illustrates an example of recreation of indexes. Recreation of indexes results in changing the combination of data groups included in each partition, as illustrated in FIG. 8. In this case, for example, the current indexes 71 and 72 are read and sets of records are generated according to new combinations of data groups. Then, for a set of records for each partition, the records are sorted and pages are created, and new indexes 73 and 74 are created and stored in a memory or the like. The new indexes 73 and 74 enable efficient use of the records in the new partitions.

The following describes the functions of the database servers 100 and 200 for performing the partition creation process according to the second embodiment.

Figure 9:
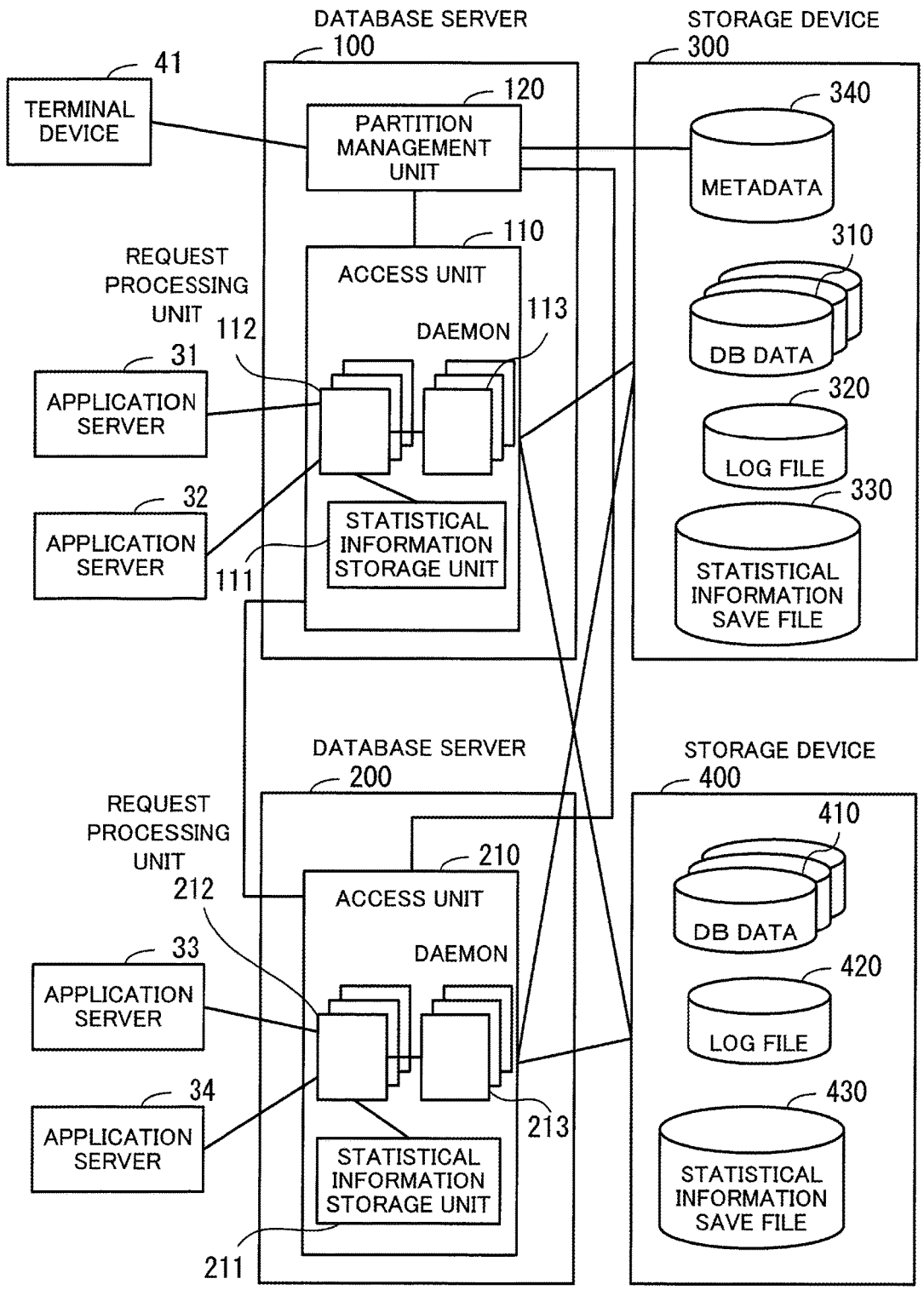
FIG. 9 is a block diagram illustrating the functions of a database server.

FIG. 9 is a block diagram illustrating the functions of a database server. The database server 100 includes an access unit 110 and a partition management unit 120. The access unit 110 accesses the storage devices 300 and 400 in accordance with to access requests from the application servers 31 and 32. The access unit 110 includes a statistical information storage unit 111, request processing units 112, and daemons 113.

The statistical information storage unit 111 stores statistical information which indicates, for each data group, an access count of the data of the data group, and so on. For example, part of the storage area of the memory 102 is used as the statistical information storage unit 111. The statistical information stored in the statistical information storage unit 111 is periodically saved to a statistical information save file 330 by a daemon, for example.

Each request processing unit 112 is activated in accordance with an access request from an application server 31 and 32, and processes the access request. When a plurality of access requests arrives, a request processing unit 112 is activated for each access request. The activated request processing unit 112 determines with reference to the metadata 340 whether the data specified by the access request belongs to a partition that is accessible by the database server 100 or not. If the access request is for the data belonging to the accessible partition, the request processing unit 112 requests a daemon 113 used for database access to access the data. If the access request is for data belonging to a partition that is accessible by the other database server 200, on the other hand, the request processing unit 112 sends the access request for the data to the database server 200. When receiving a data access result from the daemon 113 or database server 200, the request processing unit 112 returns the access result to the requesting application server.

There may be the case where a request processing unit 112 receives an access request from the database server 200. This case may be that an application server 33 and 34 issues, to the database server 200, an access request for data belonging to a partition that is accessible by the database server 100. The request processing unit 112, having received the data access request from the database server 200, requests the daemon 113 used for database access to access the requested data. Then, the request processing unit 112 returns the access result to the database server 200.

In addition, the request processing unit 112 updates the statistical information in the statistical information storage unit 111 each time the request processing unit 112 accesses data. For example, each time the request processing unit 112 accesses data, the request processing unit 112 increments the access count for the data group to which the accessed data belongs.

The daemons 113 access data in the storage devices 300 and 400. A daemon 113 is activated for each data access to the storage devices 300 and 400. To make a plurality of data accesses in parallel, a plurality of daemons 113 is activated.

The partition management unit 120 performs a partition dividing process on a database. For example, the partition management unit 120 performs partition dividing in according to a partition dividing instruction from the terminal device 41. When receiving a partition dividing instruction while a database is being used, the partition management unit 120 reconfigures partitions and causes the database servers 100 and 200 to access the new partitions.

When receiving a partition dividing instruction, the partition management unit 120 obtains the statistical information stored in the statistical information storage units 111 and 211 from the access units 110 and 210 of the database servers 100 and 200. Alternatively, the partition management unit 120 may obtain the statistical information from the statistical information save files 330 and 430 stored in the storage devices 300 and 400.

The partition management unit 120 creates as many partitions as the number of database servers on the basis of the obtained statistical information. At this time, the partition management unit 120 allocates one or more data groups to each partition such that the partitions have equal access frequencies. Then, the partition management unit 120 determines which partition is to be made accessible by each database server 100 and 200. The partition management unit 120 stores information about the created partitions as metadata 340 in the storage device 300. Then, the partition management unit 120 notifies the access units 110 and 210 of the database servers 100 and 200 of the created partitions. When receiving the notification, each access unit 110 and 210 recognizes its accessible partition among the new partitions with reference to the metadata 340.

Referring to the example of FIG. 9, a partition dividing instruction is issued from the terminal device 41 to the database server 100. Therefore, the partition management unit 120 is illustrated in the database server 100. In the case where such a partition dividing instruction is issued from the terminal device 41 to the database server 200, a process that executes the same functions as the partition management unit 120 is generated in the database server 200.

The database server 200 includes the access unit 210. The access unit 210 includes the statistical information storage unit 211, request processing units 212, and daemons 213. These units of the access unit 210 function in the same way as their counterpart units of the access unit 110 of the database server 100.

The storage device 300 includes database data 310, a log file 320, the statistical information save file 330, and metadata 340. The storage device 400 includes database data 410, a log file 420, and a statistical information save file 430. The database data 310 and 410 is the data of some or all of a plurality of data groups forming a database. The log files 320 and 420 contain data access logs, such as transaction logs and the like. The statistical information save files 330 and 430 contain statistical information. The metadata 340 is information indicating created partitions.

The database server 100 of FIG. 9 is one example of an apparatus covering the access device 2 and access control apparatus 10 of the first embodiment illustrated in FIG. 1. The access unit 110 of the database server 100 executes the functions of the access device 2, and the partition management unit 120 thereof executes the functions of the access control unit 10. Further, the storage devices 300 and 400 of FIG. 9 are one example of the storage device 1 of the first embodiment illustrated in FIG. 1. The metadata 340 stored in the storage device 300 is one example of the management information 1b of the first embodiment.

It is noted that lines connecting between units illustrated in FIG. 9 represent part of communication paths, and communication paths other than the illustrated ones may be configured. Further, the functions of the units of the database servers 100 and 200 of FIG. 9 may be implemented by a computer executing their corresponding program modules.

The following describes statistical information stored in the statistical information storage unit 111 in detail.

FIG. 10 illustrates an example of a data structure of a statistical information storage unit. The statistical information storage unit 111 stores a statistical information management table 111a. The statistical information management table 111a contains statistical information for each connection for communication via the networks 20a and 20b. The statistical information management table 111a has the following field: Connection, Connect Time, Data Group, Record Reference Count, and Record Update Count. The connection field contains the identifier (connection ID) of an established connection. The connect time field indicates when a connection was established. The Data Group field indicates the name (data group name) of a data group to which data accessed in accordance with an access request received via a corresponding connection belongs. The record reference count field indicates how many times the records in a corresponding data group were referenced. The record update count field indicates how many times the records in a corresponding data group were updated.

The following describes the contents of the metadata 340 in detail.

FIG. 11 illustrates an example of information contained in metadata. The metadata 340 includes a partition management table 341, grouping key column information 342, and a data group information table 343.

The partition management table 341 holds a correspondence between partitions and data groups. This partition management table 341 has the following fields: Partition Name, Node Name, Constituent Data Group Count, Constituent Data Group Name, and other information. The partition name field contains the name of a partition. The node name field contains the name of a database server that is able to access the data of the partition indicated by a corresponding partition name. The constituent data group count field indicates how many data groups are included in a corresponding partition. The constituent data group name field contains the names of one or more data groups included in a corresponding partition. In the case where a plurality of tables forms a database, the partition management table 341 is created for each of the tables.

The grouping key column information 342 is information about columns that are to be referenced as grouping keys at the time of dividing the records of a database into a plurality of groups. The grouping key column information 342 indicates a column count, a column name, and other information. The column count indicates the number of columns to be referenced as grouping keys. The column name is the name of a column to be referenced as a grouping key. In the case where a plurality of tables forms a database, the grouping key column information 342 is provided for each of the tables.

The data group information table 343 contains information about data groups. The data group information table 343 has the following fields: Data Group Name, Data Value, and Storage Area Information. The data group name field contains the name of a data group. The data value field contains the value of a column to be referenced as a grouping key in the records belonging to a corresponding data group. The storage area information field contains information about the storage areas of the records belonging to a corresponding data group. The storage area information indicates, for example, a space name, a size, and a beginning block number. The space name is the identification information of a storage device storing the records belonging to the data group. The size is the size of the storage area prepared for storing the records belonging to the data group. The beginning block number is the number of the beginning block of the storage area prepared for storing the records belonging to the data group.

The request processing units 112 and 212 of the database servers 100 and 200 recognize, with reference to the metadata 340 as illustrated in FIG. 11, their accessible data groups and the storage areas storing the data of the accessible data groups. For example, assume now that the application server 31 sends a request processing unit 112 a data access request indicating the product group code of a record containing data to be accessed.

In this case, the request processing unit 112 recognizes with reference to the grouping key column information 342 that data groups are created based on product group codes. Then, the request processing unit 112 searches the data group information table 343 to obtain the data group name of the data group corresponding to the data value of the product group code indicated by the access request. Then, the request processing unit 112 searches the partition management table 341 to obtain a node name from the record in which the obtained data group name is set as a constituent data group name.

If the obtained node name is the name of the database server 100, the request processing unit 112 determines that the data specified by the access request is accessible by the database server 100, and then accesses the specified data for read or write purposes via a daemon 113.

If the obtained node name is the name of the database server 200, on the other hand, the request processing unit 112 determines that the data specified by the access request is accessible by the database server 200, and then transfers the access request to the access unit 210 of the database server 200. The access unit 210 of the database server 200 then accesses the specified data for read or write purposes in accordance with the access request.

The database servers 100 and 200 access data in the storage devices 300 and 400 in the manner described above. Therefore, changing the correspondence between partition names and constituent data group names in the partition management table 341 allows the access units 110 and 210 of the database servers 100 and 200 to recognize the configuration of new partitions.

Note that the access units 110 and 210 are able to store a copy of the metadata 340 in their local memories. In this case, for example, when updating the contents of the metadata 340, the partition management unit 120 notifies the access units 110 and 210 of the metadata update. In response to this notification, the access units 110 and 210 read the metadata 340 from the storage device 300 and store a copy of the metadata 340 in their local memories. This eliminates the needs for the access units 110 and 210 to refer to the metadata 340 stored in the storage device 300 each time the access units 110 and 210 receive an access request, which results in streamlining the processing.

The following describes how to create partitions in detail.

Figure 12:
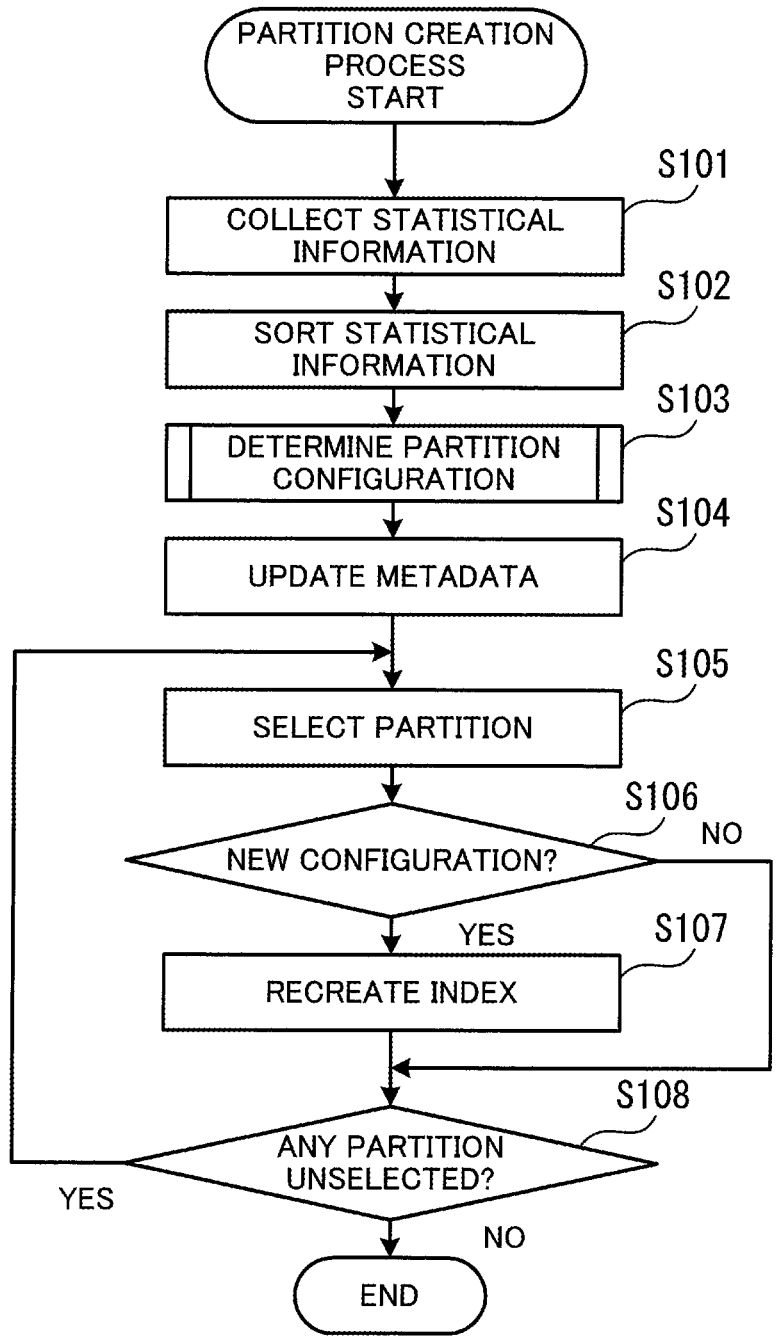
FIG. 12 is a flowchart illustrating an exemplary procedure for a partition creation process.

FIG. 12 is a flowchart illustrating an exemplary procedure for a partition creation process.

(Step S101) The partition management unit 120 aggregates statistical information in response to a partition dividing instruction received from the terminal device 41. For example, the partition management unit 120 collects the statistical information from the statistical information storage units 111 and 211 of the access units 110 and 210 of the database servers 100 and 200. The partition management unit 120 then calculates an access amount for each data group on the basis of the obtained statistical information. The access amount of a data group is calculated as the sum of its record reference count and record update count.

(Step S102) The partition management unit 120 sorts the statistical information. For example, the partition management unit 120 sorts the data groups in descending order of access amount.

(Step S103) The partition management unit 120 determines the configuration of partitions. A partition configuration determination process will be described in detail later (with reference to FIG. 13).

(Step S104) The partition management unit 120 updates the metadata 340 on the basis of the configuration of the new partitions.

(Step S105) The partition management unit 120 selects one of the partitions.

(Step S106) The partition management unit 120 determines whether the selected partition has a new configuration or not. If the selected partition has a new configuration, the process proceeds to step S107. Otherwise, the process proceeds to step S108.

(Step S107) Since the partition has a new configuration, the partition management unit 120 recreates an index for the partition, and then stores the new index in, for example, the storage areas of the database data 310 and 410.

(Step S108) The partition management unit 120 determines whether there is any unselected partition or not. If there is any unselected partition, the process proceeds back to step S105. If all of the partitions have been selected, the partition creation process is completed.

The following describes how to determine the configuration of partitions in detail.

FIG. 13 illustrates an example of determining the configuration of partitions. To determine data groups forming a partition, the data group list 80 as illustrated in FIG. 13, in which data groups are sorted by access amount, is used.

The partition management unit 120 obtains the average access amount per partition on the basis of the data group list 80 listing data groups sorted by access amount. The average access amount is calculated by dividing the total access amount by the number of partitions. The partition management unit 120 then combines data groups such that the total access amount of the combined data groups is close to the average access amount.

For example, the partition management unit 120 selects a data group in order from the highest rank from the data group list 80, and then combines the selected data group with one or more lower-rank data groups. Referring to the example of FIG. 13, a data group with the highest access amount and a data group with the least access amount are combined. In addition, a data group with the second highest access amount and data groups with the second and third least access amounts are combined.

In changing partitions, the partition management unit 120 does not change a combination for a partition if the total access amount of the partition is not identical to the average access amount but falls in a specified range from the average access amount. This reduces the number of indexes to be recreated and thus the time to recreate the indexes.

The following describes how to determine the configuration of partitions.

Figure 14:
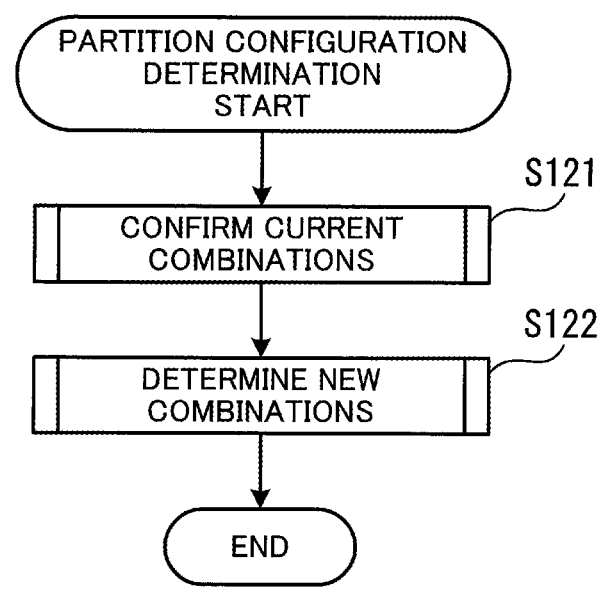
FIG. 14 is a flowchart illustrating an exemplary procedure for a partition configuration determination process.

FIG. 14 is a flowchart illustrating an exemplary procedure for a partition configuration determination process.

(Step S121) The partition management unit 120 confirms the current combinations of data groups for each partition. This step will be described in detail later (with reference to FIG. 15).

(Step S122) The partition management unit 120 creates new combinations of data groups on the basis of the current combinations of data groups such that the database serves 100 and 200 have equally-balanced loads. This step will be described in detail later (with reference to FIG. 17).

The following describes how to confirm the current combinations.

Figure 15:
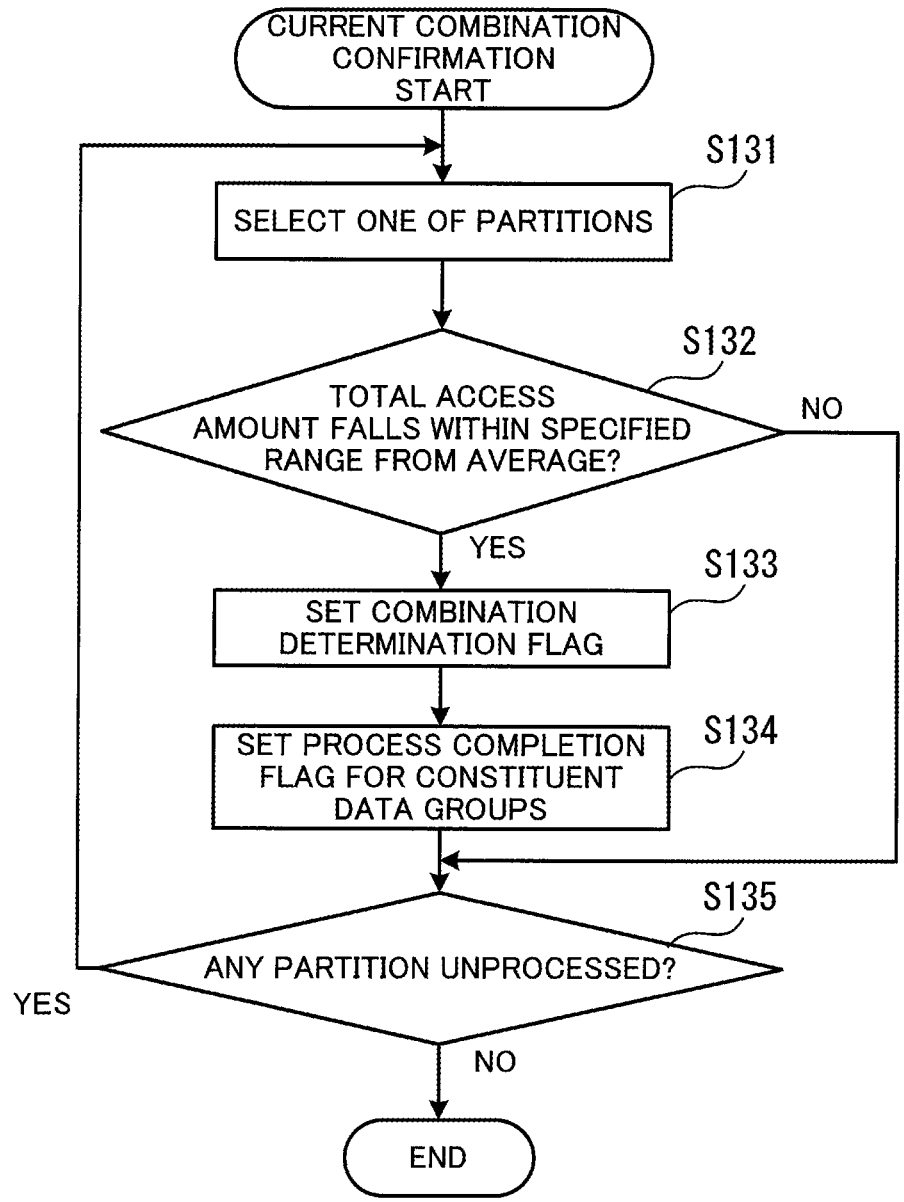
FIG. 15 is a flowchart illustrating an exemplary procedure for a current combination confirmation process.

FIG. 15 is a flowchart illustrating an exemplary procedure for a current combination confirmation process.

(Step S131) The partition management unit 120 selects one of the current partitions. For example, the partition management unit 120 obtains the partition management table 341 from the metadata 340 and stores the partition management table 341 in the memory 102. Then, the partition management unit 120 adds a combination determination flag field to the stored partition management table, and uses the partition management table as current partition information. Then, the partition management unit 120 selects partitions one by one in order from the highest rank with reference to the current partition information, and executes the following steps S132 to S135 on each selected partition.

(Step S132) The partition management unit 120 determines whether or not the total access amount of the selected partition falls within a specified range from the average access amount (for example, within ±10 percent from the average access amount). If the total access amount falls within the specified range from the average access amount, the process proceeds to step S133. Otherwise, the process proceeds to step S135.

(Step S133) The partition management unit 120 sets a combination determination flag for the selected partition. For example, the partition management unit 120 sets a value (determination completion flag) indicating that a combination has been determined, in the combination determination flag field for the selected partition in the current partition information stored in the memory 102.

(Step S134) The partition management unit 120 sets a configuration completion flag for the data groups forming the selected partition. For example, the partition management unit 120 adds a process completion flag field to the data group list 80 listing data groups sorted by access amount. Then, the partition management unit 120 sets a value (process completion flag) indicating that a data group has been processed, in the process completion flag field for each of the data groups forming the selected partition.

(Step S135) The partition management unit 120 determines whether there is any unprocessed partition or not. If there is any unprocessed partition, the process proceeds back to step S131. Otherwise, the current combination confirmation process is completed.

FIG. 16 illustrates an example of current partition information. The current partition information 81 is obtained by adding a combination determination flag field to the partition management table 341 (see FIG. 11). As a combination determination flag, a determination completion flag is set when a combination of data groups that form a corresponding partition is determined. For example, an initial value of "0" is set in the combination determination flag filed. Then, when a combination for the partition is determined, the value in the combination determination flag field for the partition is changed to "1".

FIG. 17 illustrates an example of a data group list with a process completion flag field added. A process completion flag is set for a data group in the process completion flag field added to the data group list 82 when a partition to which the data is to belong is determined. For example, an initial value of "0" is set in the process completion flag field. Then, it is determined which data groups are to belong to a partition, and the value in the process completion flag field for each of the data groups is changed to "1".

After the current combination confirmation process is complete, a new combination creation process is performed.

Figure 18:
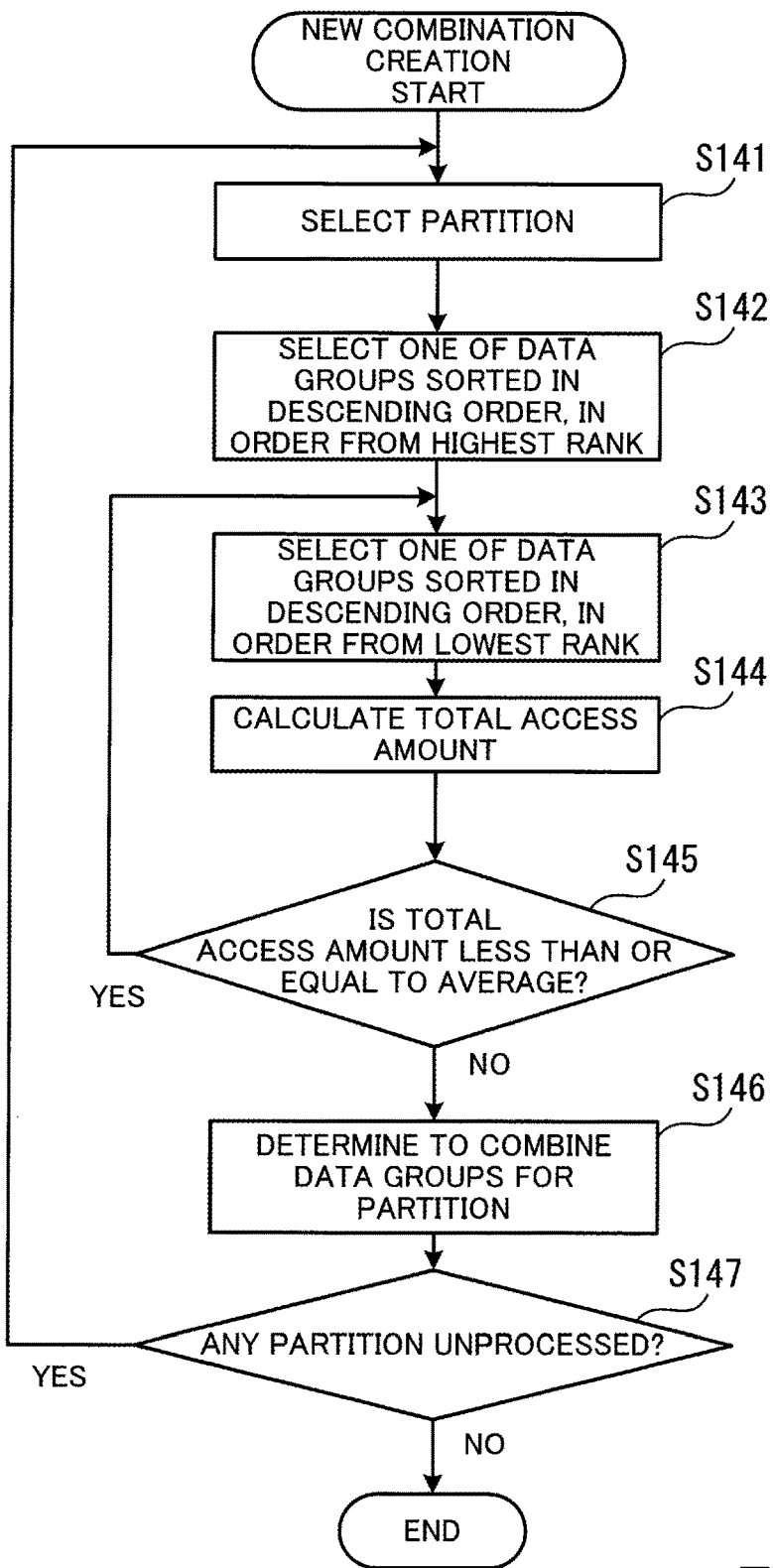
FIG. 18 illustrates an exemplary procedure for a new combination creation process.

FIG. 18 illustrates an exemplary procedure for a new combination creation process.

(Step S141) The partition management unit 120 selects one of partitions whose data groups are yet to be determined. For example, the partition management unit 120 selects one of the partition for which a determination completion flag has not been set with reference to the current partition information 81.

(Step S142) The partition management unit 120 selects one data group for which a process completion flag has not been set in the data group list 82 listing data groups sorted in descending order, in order from the highest rank.

(Step S143) The partition management unit 120 selects one data group for which a process completion flag has not been set in the data group list 82 listing data groups sorted in descending order, in order from the lowest rank.

(Step S144) The partition management unit 120 calculates the total access amount of the selected data groups.

(Step S145) The partition management unit 120 determines whether or not the total access amount of the selected data groups is lower than or equal to the average access amount. If the total access amount is lower than or equal to the average access amount, the process proceeds to step S143 where a new data group is selected. Otherwise, the process proceeds to step S146.

(Step S146) The partition management unit 120 determines to combine the data groups selected at steps S142 and S143 as data groups belonging to the selected partition. In addition, the partition management unit 120 sets a combination determination flag for the selected partition, and also sets a process completion flag for each of the selected data groups.

(Step S147) The partition management unit 120 determines whether there is any unprocessed partition for determining its combination of data groups or not. For example, if there is any partition for which a determination completion flag has not been set, the partition management unit 120 determines that there is an unprocessed partition, and in this case the process proceeds back to step S141. Otherwise, the new combination creation process is completed.

As described above, it is possible to equally balance the access amount among all partitions. This minimizes an imbalance in data access load among database servers and achieves the efficient processing of the system.

In addition, the configuration of data respectively managed by a plurality of database servers are changed by only changing the combinations of the data groups belonging to partitions. Therefore, partitioning is changed smoothly. That is to say, even when data groups that belong to partitions are changed, data does not need to be migrated within the database. Thus, the partitioning is changed in a short time.

Note that indexes are recreated for partitions whose data groups are changed. In the second embodiment, the current combinations of data groups remain for partitions whose total access amounts are close to the average. This makes it possible to reduce the number of partitions whose indexes need to be recreated according to a change in the combinations of data groups, and thus to streamline the processing.

In addition, partitions are automatically reconfigured on the basis of business performance in a system such as to equally balance the access load of a database. This reduces the design and operation costs. For example, in the case of 10 terabyte data, it takes time for design plus 56 hours (in the case of disk I/O performance of 100 MB/s) to perform partition reconfiguration involving data copy between disks. According to the second embodiment, it takes only several minutes to reconfigure partitions.

Further, the partition reconfiguration does not involve data migration between storage devices. Therefore, in the course of the partition reconfiguration, the access units 110 and 210 are able to access the storage devices 300 and 400 on the basis of the metadata 340 that is not yet updated. Then, once the metadata 340 is updated, the access units 110 and 210 use the updated metadata 340. Since the original metadata 340 is used for data access during the partition reconfiguration, the service halt time for data access by the database servers 100 and 200 is very short even when partitions are reconfigured.

In this connection, the second embodiment uses the database server 100 to reconfigure partitions. Alternatively, the partitions may be reconfigured by the database server 200 or by another device than the database serves 100 and 200. For example, a management device provided in the system may be designed to collect statistical information from the database servers 100 and 200 and reconfigure the partitions.

The foregoing is considered as illustrative only of the embodiments. Each constitutional element in the embodiments may be replaced by any other element having equivalent functions. Further, any other configuration or step may be added thereto. Still further, two or more configurations (features) in the embodiments may be combined to provide the disclosed techniques.

According to one aspect, it is possible to reduce an access load imbalance among a plurality of devices that access data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer which has a processor and a memory, to perform a process comprising:

controlling, by the processor, read or write access processing from a plurality of access devices to a plurality of data groups generated by dividing data in a storage device, by using first data group management information associating an access device among the plurality of access devices with at least one data group configured as an access destination from the access device, wherein the first data group management information is stored in the memory;

calculating, by the processor, an access frequency value indicating a frequency of the read or write access processing to a data group in a partition, the partition been formed of the plurality of data groups, by at least one access device associated with the data group in the first data group management information, with regard to each of the plurality of data groups;

calculating, by the processor, an access frequency value indicating a frequency of the read or write access processing to a data group in a partition, the partition been formed of the plurality of data groups, by at least one access device associated with the data group in the first data group management information, with regard to each of the plurality of data groups;

calculating, by the processor, a first total access frequency value of a first partition associated with a first access device in the first data group management information and a second total access frequency value of a second partition associated with a second access device in the first data group management information; and moving, by the processor, at least one data group in the first partition to the second partition to reduce a difference between the first total access frequency value and the second total access frequency value, wherein moving the partitions is a reconfiguration process of changing the combinations of data groups forming the partitions, in order to equally balance processing load among the plurality of partitions, by updating the first data group management information, wherein each of the plurality of partitions is associated with at least one of storage areas in the storage device and the partitions are reconfigured so as to equally balance processing load among the plurality of partitions or to minimize a load imbalance among the plurality of partitions; and the first data group management information includes a partition management table holding a correspondence between partitions and data groups, wherein the partition management table uses constituent data group count fields and a grouping key column to manage the reconfiguration process.

2. The non-transitory computer-readable storage medium according to claim 1, wherein:
the memory stores the first data group management information and second data group management information associating each of the plurality of partitions with at least one of storage areas in the storage device.

3. The non-transitory computer-readable storage medium according to claim 1, wherein:
the process further includes
calculating an average access frequency of the first access device, based on the access frequency of the first access device; and
wherein when a difference between the access frequency of the first access device and the average access frequency is smaller than or equal to a predetermined threshold, the processor does not move the data group in the first partition to the second partition.

4. An access control method executed by a computer having a processor and a memory, the method comprising:
controlling, by the processor, read or write access processing from a plurality of access devices to a plurality of data groups generated by dividing data in a storage device, by using first data group management information associating an access device among the plurality of access devices with at least one data group configured as an access destination from the access device, wherein the first data group management information is stored in the memory;
calculating, by the processor, an access frequency value indicating a frequency of the read or write access processing to a data group in a partition, the partition been formed of the plurality of data groups, by at least one access device associated with the data group in the first data group management information, with regard to each of the plurality of data groups;
calculating, by the processor, a first total access frequency value of a first partition associated with a first access device in the first data group management information and a second total access frequency value of a second partition associated with a second access device in the first data group management information; and
moving, by the processor, at least one data group in the first partition to the second partition to reduce a difference between the first total access frequency value and the second total access frequency value,
wherein moving the partitions is a reconfiguration process of changing the combinations of data groups forming the partitions, in order to equally balance processing load among the plurality of partitions,
by updating the first data group management information, wherein each of the plurality of partitions is associated with at least one of storage areas in the storage device and the partitions are reconfigured so as to equally balance processing load among the plurality of partitions or to minimize a load imbalance among the plurality of partitions; and the first data group management information includes a partition management table holding a correspondence between partitions and data groups, wherein the partition management table uses constituent data group count fields and a grouping key column to manage the reconfiguration process.

5. An access control apparatus comprising:
a memory configured to store data group management information associating an access device among a plurality of access devices with at least one data group being an access destination from the access device, wherein said at least one data group is included in a plurality of data groups generated by dividing data in a storage device;
a processor configured to perform a process including:
calculating an access frequency value indicating a frequency of the read or write access processing to a data group in a partition, the partition been formed of the plurality of data groups by at least one access device associated with the data group in the data group management information, with regard to each of the plurality of data groups;
calculating a first total access frequency value of a first partition associated with a first access device in the information and a second total access frequency value of a second partition associated with a second access device in the information; and
moving at least one data group in the first partition to the second partition to reduce a difference between the first total access frequency value and the second total access frequency value, wherein moving the partitions is a reconfiguration process of changing the combinations of data groups forming the partitions, in order to equally balance processing load among the plurality of partitions,
by updating the data group management information, wherein each of the plurality of partitions is associated with at least one of storage areas in the storage device and the partitions are reconfigured so as to equally balance processing load among the plurality of partitions or to minimize a load imbalance among the plurality of partitions; and the first data group management information includes a partition management table holding a correspondence between partitions and data groups, wherein the partition management table uses constituent data group count fields and a grouping key column to manage the reconfiguration process.

* * * * *